Aug. 4, 1942.　　　　C. DAUM　　　　2,292,059
MIRROR CONSTRUCTION
Filed May 7, 1941

INVENTOR
Charles Daum
BY
ATTORNEY

Patented Aug. 4, 1942

2,292,059

UNITED STATES PATENT OFFICE 2,292,059

MIRROR CONSTRUCTION

Charles Daum, Forest Hills, N. Y.

Application May 7, 1941, Serial No. 392,253

6 Claims. (Cl. 248—300)

This invention relates to mirror constructions, and more particularly to a mirror arrangement readily adapted to be secured to a table, such as a dressing table.

In accordance with the invention, I provide a mirror comprising three sections; a middle section and two side sections hingedly connected therewith. The connection of the sides to the middle section is such that the sides may be flatly collapsed for storage. Bent hinges are used to connect the side section to the middle one. The middle section is secured to a framework permitting fastening of the mirror arrangement to a horizontal support or table. The framework is arranged so that the mirror is inclined or tilted, whereby its lower edge projects with respect to its upper edge.

It is among the objects of the invention to provide a mirror which may be readily secured to any horizontal support, as for example, to a dressing table.

Another object of the invention is to provide a mirror which is tilted at a predetermined angle when secured to a horizontal support, its lower edge projecting forwardly with respect to its upper edge.

These and further objects of the invention will become more apparent in the following description of preferred embodiments of the invention illustrated in the drawing, wherein.

Figures 5, 6:
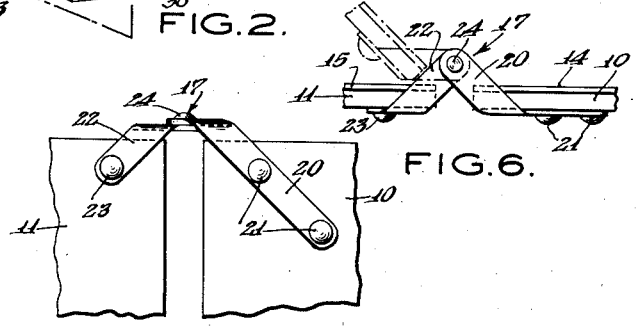
Figure 5 is a plan view taken from the rear showing in detail the hinge which connects the middle section with a side one.
Figure 6 is a partial view, taken at right angles to Figure 5, showing the hinge connection in two different positions.

Referring to the drawing, the illustrated embodiment of the mirror of the invention comprises a middle section 10 and two side sections 11, 12. Sections 10, 11 and 12 may be of wood or any suitable compressed fibrous material. Middle section 10 and sides 11, 12 are each provided with a plurality of lugs 13 secured thereto by rivets. Lugs 13 respectively support mirrors 14, 15 and 16 on the sections 10, 11, 12. Side 11 is connected with middle 10 by two bent hinges 17. Side section 12 is similarly connected to middle section 10 by two hinges 18. Hinges 17, 18 are of the same construction as shown in detail in Figures 5 and 6.

Hinge 17 comprises strip 20 secured to section 10 by rivets 21, and another strip 22 secured by rivet 23 to side section 11. Strips 20, 22 are bent so that there is a clearance between middle section 10 and side section 11 when the mirror is opened. Strips 20, 22 are connected together by rivet 24. Such construction renders it possible to fold the two side sections 11, 12 flatly one above the other because pivot 24 of the hinge is in a plane different from the one passing through mirror 14.

Middle section 10 is provided with a framework comprising two parts 25, 26 both of the same construction, and preferably of metal strips. Framework 25 consists of a substantially straight metal strip 27, the upper portion of which is slightly bent and secured to middle section 10 by rivet 28. The shank of rivet 28 is upset so that it is flush with the surface of middle section 10. Framework 25 comprises another metal strip 30 having a portion 31 that is flush with the rear surface of middle section 10. The lower end of portion 31 is secured to middle section 10 by rivet 32. Metal strip 30 is bent below rivet 32 as shown at 33. Metal strip 30 has a portion 34 that is parallel with metal strip 27, and secured thereto by rivets 35. The end portion 36 of metal strip 30 is at right angles with the free end of metal strip 27.

Figure 1:
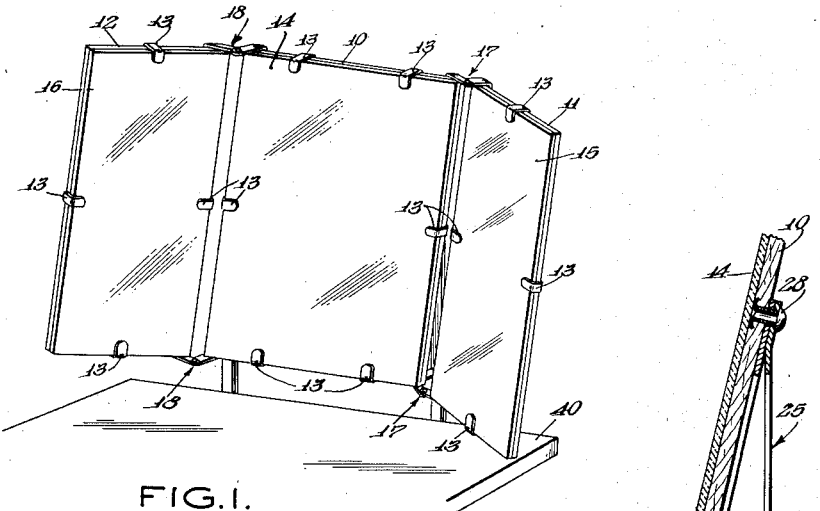
Figure 1 is a front view in perspective of the mirror of the invention.
Figures 2, 3:
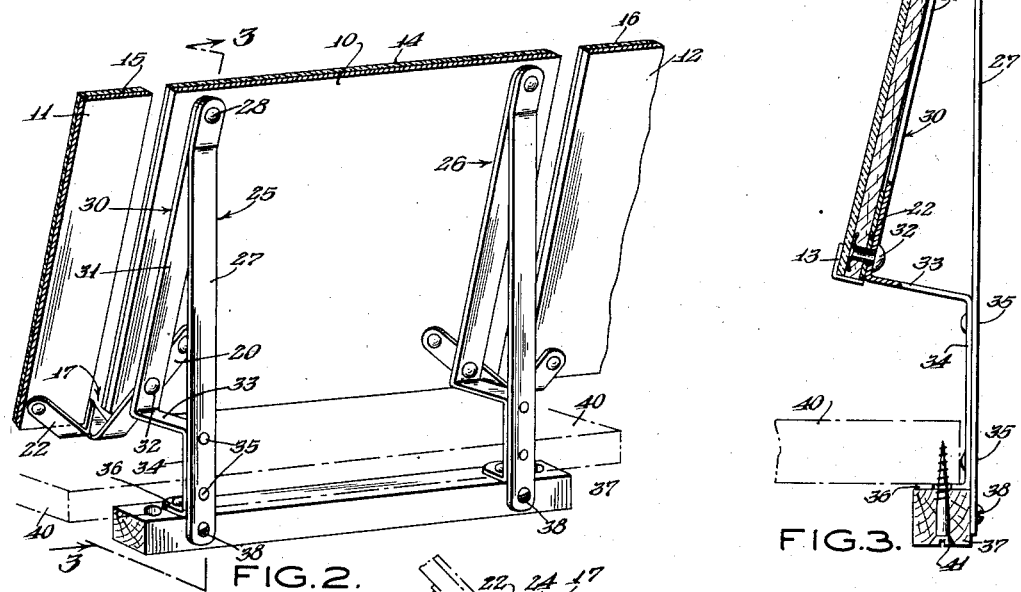
Figure 2 is a rear view in perspective of the mirror of Figure 1 on an enlarged scale, with parts broken away.
Figure 3 is a longitudinal section taken along the line 3—3 of Figure 2, on an enlarged scale.
Figure 4:
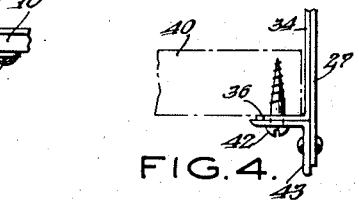
Figure 4 is a detail view similar to Figure 3 showing a modified construction.

A wood block 37 is arranged between metal strip section 36 and the lower end of metal strip 27. Wood block 37 is secured to metal strip 27 by screw 38. Metal strip portion 36 may be positioned below the lower edge of a table 40 as shown in Figures 2 and 3. It may be secured thereto by countersunk screw 41. As shown in Figure 4, wood block 37 may be omitted and the end portion 36 of metal strip 30 may directly be secured to table 40 by screw 42. Angle iron 43 serves to reinforce the lower end of metal strip 27 and connect it with end portion 36.

The construction of frame work 25, 26 makes it possible to readily secure the mirror to the lower edge of a dressing table. In this position the lower edge of the mirror projects with respect to the upper edge thereof. Furthermore, the lower edge of the mirror is arranged a predetermined distance above dressing table 40 to facilitate the opening and closing movements of side sections 10, 11. The two side sections 11, 12 may be opened and closed at will and may be adjusted to any desired angle so that a person sitting in front of the mirror can comfortably see into it from the front as well as the sides.

Various changes and modifications may be made to the details of construction of the invention without departing from the broader spirit and scope thereof, as set forth in the following claims.

I claim:

1. A frame structure for supporting a mirror or the like including, a strip member adapted to be secured to said mirror or the like, said strip member being bent below said mirror or the like and having a vertical end portion for attachment to a horizontal support, whereby the upper edge of said mirror or the like is inclined towards the rear when said strip end portion is secured to a horizontal support.

2. A frame structure for supporting a mirror or similar plane surface, comprising, a first strip secured to and bent below said such surface, said first metal strip having an L-shaped end portion for attachment to the edge of a horizontal support, and a second reinforcing strip connecting the upper portion of said first metal strip with its lower portion.

3. A stand for securing a mirror or similar plane surface in a tilted position onto a horizontal support comprising a first metal strip fastened to the rear of such surface and having its lower end bent so that such surface is inclined when the lower end of said metal strip is secured to a horizontal support, and a second reinforcing metal strip connecting the upper and the lower end of said first metal strip, the lowermost end of said first metal strip being bent at right angles with respect to said second metal strip.

4. A bracket for supporting a plane surface, as a mirror in an inclined position, with the lower edge forwardly of the upper edge thereof, including a strip member adapted to be connected to a horizontal support in a vertical position, the upper end of said member being angularly offset, a second strip member mated at its upper end with the offset portion of said first member to define the angle of inclination of the surface to be supported by said bracket, the two members being connected to maintain the angularity therebetween, by the formation of bends in the second member to locate portions thereof at approximately right angles to each other, one of such portions being parallel to said first member and fixed thereto.

5. A frame structure for supporting a mirror or the like including a strip member adapted to be secured at one end to the mirror or the like and, at its other end, to a horizontal support, said strip intermediate its length being bent below said mirror or the like, the end secured to said horizontal support embodying an offset portion adapted for engagement with a horizontal surface of said support.

6. A frame structure for supporting a mirror or the like including a strip member adapted to be secured at one end to the mirror or the like, and at its other end, to a horizontal support, said strip intermediate its length being bent below and at an angle to said mirror or the like, the end secured to said horizontal support embodying upstanding and offset portions adapted for engagement with corresponding upstanding and offset surfaces of said support.

CHARLES DAUM.